(12) United States Patent
Zhang et al.

(10) Patent No.: US 9,165,344 B2
(45) Date of Patent: Oct. 20, 2015

(54) IMAGE PROCESSING APPARATUS AND METHOD

(75) Inventors: Pin Zhang, Beijing (CN); Hongfeng Ma, Beijing (CN)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 10 days.

(21) Appl. No.: 13/617,935

(22) Filed: Sep. 14, 2012

(65) Prior Publication Data

US 2013/0243279 A1  Sep. 19, 2013

(30) Foreign Application Priority Data

Sep. 16, 2011  (CN) .......................... 2011 1 0281113

(51) Int. Cl.
*G06K 9/00* (2006.01)
*G06T 5/00* (2006.01)
*G06T 5/10* (2006.01)

(52) U.S. Cl.
CPC . *G06T 5/002* (2013.01); *G06T 5/10* (2013.01); *G06T 2207/10072* (2013.01); *G06T 2207/20016* (2013.01); *G06T 2207/20064* (2013.01); *G06T 2207/20192* (2013.01)

(58) Field of Classification Search
None
See application file for complete search history.

(56) References Cited

U.S. PATENT DOCUMENTS

| 7,260,272 | B2 * | 8/2007 | Lin et al. ....................... 382/275 |
| 7,515,763 | B1 | 4/2009 | Zhong | |
| 2002/0057736 | A1 * | 5/2002 | Fuji et al. ....................... 375/240 |
| 2004/0008904 | A1 * | 1/2004 | Lin et al. ....................... 382/275 |
| 2006/0210186 | A1 | 9/2006 | Berkner | |
| 2008/0197842 | A1 * | 8/2008 | Lustig et al. .................. 324/307 |
| 2009/0290067 | A1 * | 11/2009 | Ishiga ........................... 348/607 |

(Continued)

FOREIGN PATENT DOCUMENTS

CN  101467897 A  7/2009

OTHER PUBLICATIONS

Pelin Gorgel, Ahmet Sertbas, Osman Ucan. "A Wavelet-based Mammographic Image Denosing and Enhancement with Homomorphic Filtering" J. Med System, Springer,34:993-1002. 2010.*

(Continued)

*Primary Examiner* — Bhavesh Mehta
*Assistant Examiner* — Oneal R Mistry
(74) *Attorney, Agent, or Firm* — Oblon, McClelland, Maier & Neustadt, L.L.P.

(57) ABSTRACT

An image processing apparatus and method are disclosed. The apparatus may include: a wavelet transform device for performing wavelet transform on an input image to decompose the input image into a plurality of levels of different scales, each level including a low frequency component and a plurality of high frequency components; a compensation template generating device for generating a compensation template for each level according to the plurality of high frequency components in the level, the compensation template reflecting combination feature of the plurality of high frequency components; a de-noising device for de-noising the low frequency component of each level and performing edge compensation on the low frequency component with the compensation template to acquire a compensated low frequency component; and a wavelet inverse transform device for performing inverse wavelet transform with the compensated low frequency component and the high frequency components of each level to acquire a de-noised image.

16 Claims, 6 Drawing Sheets

(56) References Cited

U.S. PATENT DOCUMENTS

2010/0225789 A1* 9/2010 Gheorghe et al. ............. 348/241
2010/0228129 A1* 9/2010 Osumi ......................... 600/443
2012/0035478 A1* 2/2012 Nishihara et al. ............. 600/443

OTHER PUBLICATIONS

Chinese Office Action issued Oct. 8, 2014, in China Patent Application No. 201110281113.X (with English translation).

* cited by examiner

IMAGE PROCESSING APPARATUS AND METHOD

CROSS-REFERENCE TO RELATED APPLICATIONS

This application is based upon and claims the benefit of priority from Chinese Patent Application No. 201110281113.X, filed on Sep. 16, 2011, the entire contents of which are incorporated herein by reference.

FIELD

The present disclosure relates to the field of image processing, and in particular to an image processing apparatus and method for de-noising an input image by using wavelet transform.

BACKGROUND

Image de-noising is an important branch in the field of image processing. As an effective de-noising algorithm, the application of wavelet transform to image de-noising becomes popular.

In a known wavelet de-noising method, an input image is firstly decomposed into a plurality of levels by using wavelet transform, and then the wavelet coefficients of at least two of the levels are modified by scaling the wavelet coefficients using different scale-dependent parameters for each of the levels, thereby improving the de-noising effect. Related references include U.S. Patent Application U.S. 2006/0210186 A1.

BRIEF DESCRIPTION OF THE DRAWINGS

The foregoing and other objects, features and advantages of the present disclosure will be better understood with reference to the following description taken in conjunction with accompanying drawings in which components are merely illustrative of the principle of the present disclosure, and identical or like technical features or components are represented with identical or like reference signs.

DETAILED DESCRIPTION

An image processing apparatus and method for de-noising an input image by using wavelet transform are provided in some embodiments of the present disclosure.

A simplified summary of the present disclosure is given below to provide a basic understanding of the present disclosure. The summary is not intended to identify the key or critical parts of the present disclosure or limit the scope of the present disclosure, but merely to present some concepts in a simplified form as a prelude to the more detailed description that is discussed later.

In accordance with an aspect of the present disclosure, there is provided an image processing apparatus which may include: a wavelet transform device for performing wavelet transform on an input image to decompose the input image into a plurality of levels of different scales, each level including a low frequency component and a plurality of high frequency components; a compensation template generating device for generating a compensation template for each level according to the plurality of high frequency components in the level obtained from the wavelet transform, the compensation template reflecting the combination feature of the plurality of high frequency components of the level; a de-noising device for de-noising the low frequency component of each level and performing edge compensation on the low frequency component of the level with the compensation template of the level to acquire a compensated low frequency component; and a wavelet inverse transform device for performing inverse wavelet transform with the compensated low frequency component and the high frequency components of each level to acquire a de-noised image.

In accordance with an aspect of the present disclosure, there is provided an image processing method which may include: performing wavelet transform on an input image to decompose the input image into a plurality of levels of different scales, each level including a low frequency component and a plurality of high frequency components; generating a compensation template for each level according to the plurality of high frequency components in the level obtained from the wavelet transform, the compensation template reflecting the combination feature of the plurality of high frequency components of the level; de-noising the low frequency component in each level and performing edge compensation on the de-noised low frequency component of the level with the compensation template of the level; and performing inverse wavelet transform with the compensated low frequency component and the high frequency components of each level to acquire a de-noised image.

Moreover, a computer program for realizing the above method is also provided in an embodiment of the present disclosure.

Additionally, in an embodiment of the present disclosure, there is further provided a computer program product in the form of a medium at least readable to a computer, on which computer program codes for realizing the image processing method are recorded.

Embodiments of the present disclosure are described below with reference to the accompanying drawings. In the present disclosure, the elements and features described in an accompanying drawing or embodiment may be combined with those described in one or more other accompanying drawings or embodiments. It should be noted that for the sake of clarity, the components and processing that are unrelated to the present disclosure and well known to those of ordinary skill in the art are not described herein.

An image processing apparatus and method for de-noising an input image through the wavelet transform are provided in some embodiments of the present disclosure.

It should be appreciated that the apparatus and method provided in the embodiments of the present disclosure can be applied to de-noise images of various types, for example, medical images or the like. A medical image may refer to an image formed by the data of an examinee obtained by a medical imaging device, which includes, but not limited to: an X-ray imaging diagnostic device, an ultrasonic diagnostic imaging device, a computed tomography (CT) device, a magnetic resonance imaging (MRI) diagnostic device and a positron emission tomography (PET) device or the like. Specifically, the input image processed by the apparatus and method provided in embodiments of the present disclosure may be a medical image acquired by scanning a part of a human body with a medical diagnostic device, for example, a cerebral artery image acquired by performing a CT scan on a patient or other types of medical images.

Additionally, the apparatus and method provided in embodiments of the present disclosure can be used to process a n-dimensional image, wherein n=1, 2, 3, . . . , N (N≥1).

Figure 1:
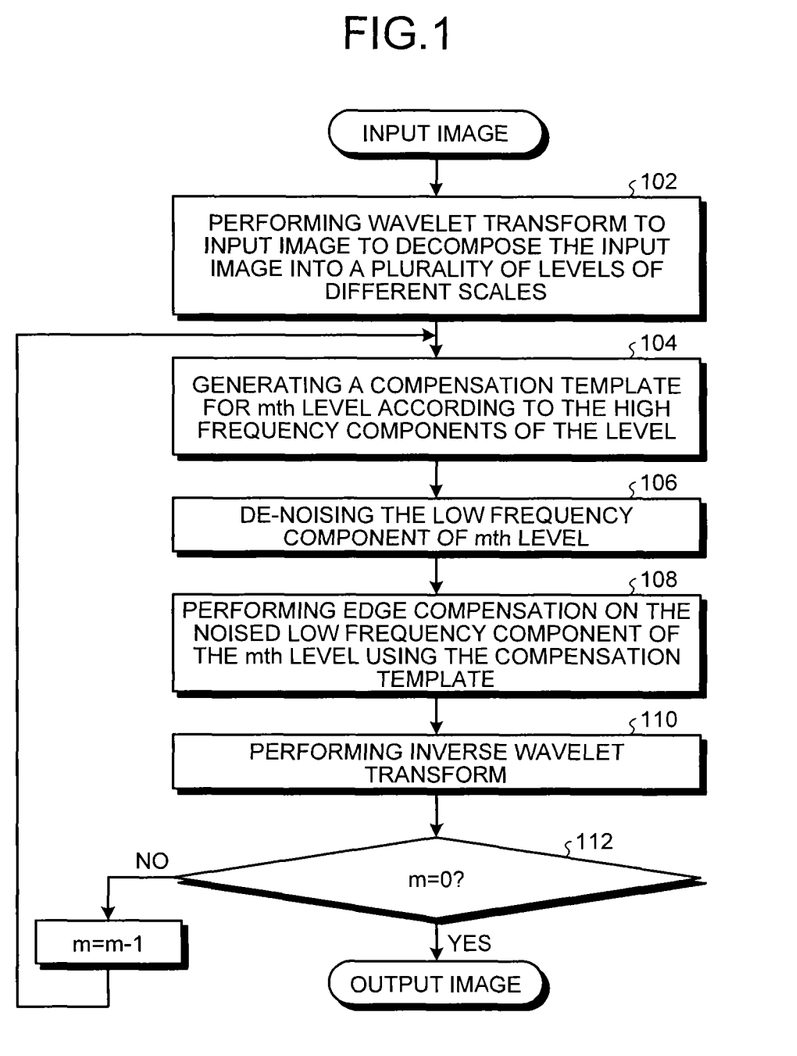
FIG. 1 is a flow chart illustrating an image processing method according to an embodiment of the present disclosure.

FIG. 1 is a flow chart illustrating an image processing method according to an embodiment of the present disclosure.

When using a wavelet de-noising algorithm to de-noise an image, some useful information in the image may be smoothed, which may result in a blurring of the image. In this embodiment, firstly an input image is decomposed into a plurality of levels of different scales through a wavelet transform, wherein each level includes a low frequency component and a plurality of high frequency components, and then a compensation template reflecting the combination characteristic of the plurality of high frequency components is generated with the high frequency components, and an edge compensation is performed on the de-noised low frequency component using the compensation template, thereby protecting the edge of the image from being blurred during the de-noising process.

As shown in FIG. 1, the image processing method may include steps 102, 104, 106, 108, 110 and 112.

In step 102, an input image is subjected to wavelet transform so that the input image is decomposed into a plurality of levels of different scales. In this embodiment, it is assumed that the input image is decomposed, through the wavelet transform, into m+1 levels, that is, levels 0, 1, . . . , m (m≥1). As shown in FIG. 1, the following processing is started with the level of the highest scale (e.g. the mth level).

Optionally, the number of levels, i.e. m+1, can be set to be any appropriate value, such as 2, 3, 4 or the like (that is, m can be set to be 1, 2, 3 or the like). However, it should be appreciated that the number of levels is not limited to the specific values mentioned above and can be determined for the wavelet decomposition as needed. In addition, any appropriate algorithm, such as orthogonal wavelet transform algorithm or biorthogonal wavelet transform algorithm or the like, can be used to in the wavelet transform. The present disclosure is not limited to any specific wavelet transform algorithm.

Then, in step 104, a compensation template is generated for each level according to the plurality of high frequency components in the level obtained from the wavelet transform. The generated compensation template reflects the edge information of the input image reserved in the level. Some information such as edge and/or texture is reserved in the high frequency components in all directions of a level of a high scale after the wavelet transform is performed, thus a compensation template can be formed by combining the plurality of high frequency components of each level so that the generated compensation template can reflect the combination characteristics of the high frequency components of the level and thereby reflect the edge information of the input image reserved in the high frequency components in all directions of the level.

Figure 7:
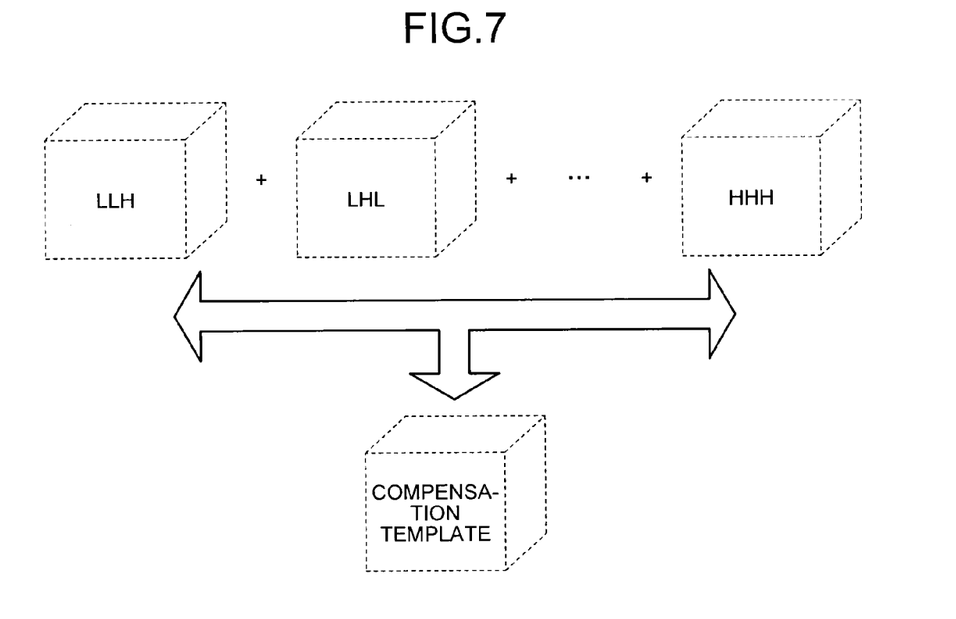
FIG. 7 is a schematic diagram illustrating the generation of a compensation template with high frequency components according to a specific embodiment of the present disclosure.

For instance, providing the input image is a two-dimensional image, after the wavelet transform is performed, each level includes four frequency components (that is, 4 sub-volumes) LL, HL, LH and HH, wherein LL is of low frequency in both directions X and Y and is so referred to as a low frequency component; each of HL, LH and HH is of high frequency in at least one of directions X and Y. For instance, HL is of high frequency in direction X but low frequency in direction Y, LH is of low frequency in direction X but high frequency in direction Y, and HH is of high frequency in both directions X and Y. Therefore, HL, LH and HH are three high frequency components in different directions. For another instance, providing the input image is a three-dimensional image, after the wavelet transform is performed, each level includes eight frequency components LLL, LHL, LHH, LLH, HLL, HHL, HLH and HHH, wherein LLL is of low frequency in all directions X, Y and Z and is so referred to as a low frequency component; each of LHL, LHH, LLH, HLL, HHL, HLH and HHH is of high frequency in at least one of directions X, Y and Z. For example, LHL is of low frequency in directions X and Z but high frequency in direction Y, and the rest may be deduced by analogy. Therefore, LHL, LHH, LLH, HLL, HHL, HLH and HHH are seven high frequency components in different directions. FIG. 7 shows an example of a three-dimensional input image. In the example shown in FIG. 7, each level obtained from wavelet transform includes seven high frequency components LLH, LHL, LHH, HLL, HHL, HLH and HHH, which can be combined to generate a compensation template for the level, by using the embodiment or example of a compensation template generation method described below with reference to FIG. 2.

Then, the low frequency component of each level is de-noised in step 106 using any appropriate method, such as Gauss filtering, isotropic diffusion filtering or anisotropic diffusion filtering, or the like. The present disclosure is not limited to any specific de-noising method.

It should be noted that step 106 and step 104 may be exchanged in execution order, for example, the low frequency component may be de-noised (step 106) before the compensation template is generated (step 104).

In step 108, edge compensation is performed on the de-noised low frequency component of each level using the compensation template of the level.

As mentioned above, the compensation template generated in the above step can reflect the edge information of the input image reserved in the level, and therefore, the edge information removed from the low frequency component can be compensated by using the edge information in the compensation template so as to compensate the edge of the de-noised low frequency component. As a specific embodiment, the low frequency component of each level can be compensated by using the method described below with reference to FIG. 3.

In step 110, an inverse wavelet transform is performed with the compensated low frequency component and the high frequency components of each level. It should be appreciated that the inverse wavelet transform can be performed by using any appropriate algorithm, the description of which is omitted herein.

Then in step 112, a determination is made on whether the processing has proceeded to the level of the smallest scale (the 0th level), that is, whether or not m is equal to 0, if so, the processing is ended to output the de-noised image, otherwise, the processing returns to step 104 to repeat the aforementioned processing on the (m−1)th level.

In the embodiment above, since edge compensation is performed on the de-noised image by using the compensation template reflecting the combination characteristics of the high frequency components of each level, the blurring caused in the image by the de-noising processing may be avoided.

In addition, since the de-noising process generally causes blurring of the image, the conventional wavelet de-noising method typically uses a compromise algorithm so that the edges in the image are not severely blurred when filtering out the noises. In the embodiment of the present disclosure, due to the use of the edge compensation mentioned above, any appropriate de-noising algorithm can be used in the de-noising step so as to filter as much noise as possible without worrying about the blurring pf the edges in the image. The method provided in the present disclosure can remove a large amount of noise while protecting the edge of the image from being blurred.

Some specific embodiments and/or examples of the compensation template generation method are described below with reference to FIG. 2.

Figure 2:
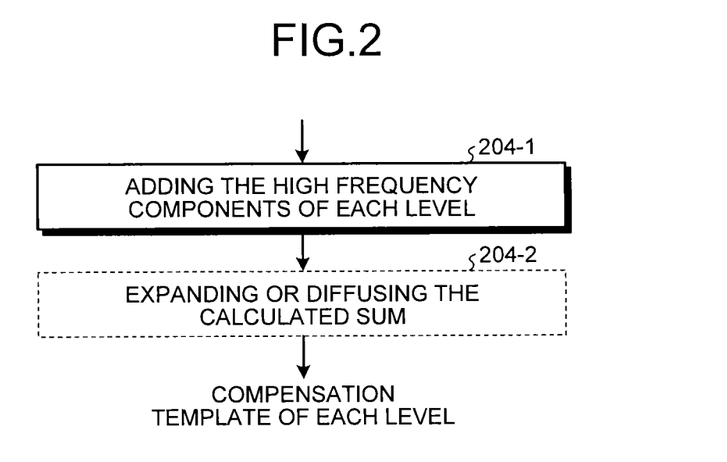
FIG. 2 is a flow chart illustrating a specific embodiment of the compensation template generation method used in the embodiment of FIG. 1.

As shown in FIG. 2, the high frequency components of each level may be added (step 204-1) and the sum may be used as the compensation template of the level. For instance, the absolute values of the wavelet coefficients in each high frequency component may be summated without considering the direction information of the high frequency component. As a specific example, the compensation template can be calculated for each level according to the following formula:

$$V_{added} = \sum_{i=1}^{N} V_i \quad (1)$$

wherein $V_i$ represents a high frequency component (or the absolute value thereof) of a scale level ($1 \leq i \leq N$), N represents the number of the high frequency components in the level, $V_{added}$ represents the sum of high frequency components of the level, and may be used as the compensation template of the level. The compensation template generated by this method may reflect the high-frequency information (edge information) reserved in each direction of the level of this scale. In addition, this simple compensation template generation method can improve the efficiency of image de-noising.

As other examples, the plurality of high frequency components in a level can be combined by using other appropriate methods as long as the generated compensation template can reflect the combination characteristics of the high frequency components. For instance, the gradient of each high frequency component may be calculated and added, and the sum may be used as the compensation template. For another instance, an edge detection processing may be performed on each high-frequency component, and the processed high frequency components may be added and the sum may be used as the compensation template, or the weighted sum of the high frequency components may be calculated as the compensation template.

During a wavelet de-noising processing, the change, near a singularity, of the wavelet coefficients may lead to Gibbs phenomenon. As a preferred example, as shown in FIG. 2, the calculated sum of the high frequency components of each level may be expanded or diffused (the dotted box 204-2 shown in FIG. 2) to increase the range of the generated compensation template. For instance, the calculated sum of the high frequency components may be externally expanded by several points (e.g. one or more points, the specific number of which is determined as needed and is therefore not limited herein and contributes no limitation to the present disclosure) to make the range of the compensation template slightly larger than that of each frequency component of the level so that the compensation template can completely cover the edge, so as to avoid the loss or cutoff of the high frequency edge information and eliminate the Gibbs phenomenon and the blurred edge while keeping the local continuity effect of the filtering. Any appropriate expansion or diffusion algorithm, such as diffusion filtering algorithm, or expansion algorithm or opening and closing operation in digital graphics, can be adopted. The present disclosure is not limited to any specific example of expansion or diffusion algorithms.

Some specific embodiment and/or example for edge compensation that is performed on the low frequency component of each level with the compensation template generated for the level are described below with reference to FIG. 3.

Figure 3:
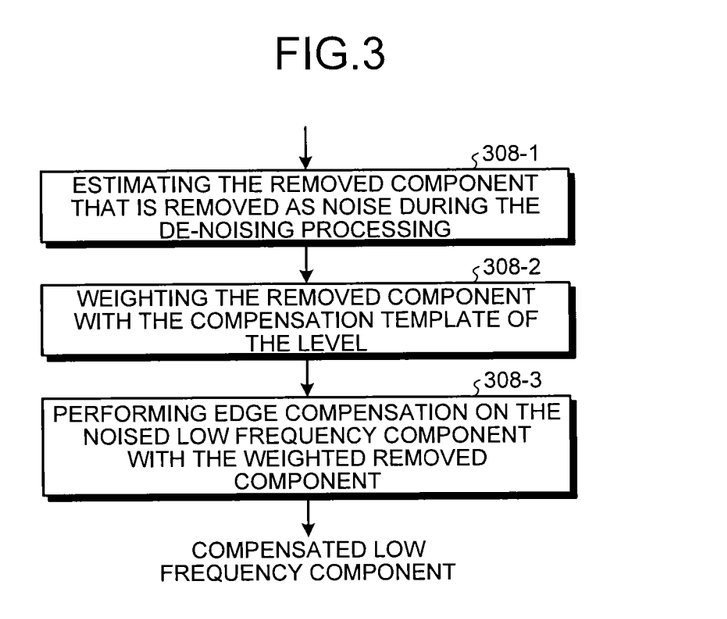
FIG. 3 is a flow chart illustrating a specific embodiment of edge compensation that is performed on the de-noised low frequency component of each level with a compensation template.

FIG. 3 is a flow chart illustrating a specific embodiment for edge compensation that is performed on the de-noised low frequency component of each level with a compensation template. As mentioned above, the component removed as noise during the de-noising process may contain some useful information (e.g. edge) that is mistakenly removed as noise. In the method shown in FIG. 3, the mistakenly removed useful information may be recovered by using the edge information reflected in the compensation information. Specifically, the component that is filtered out as noise (e.g., the component removed during the de-noising process) may be weighted, that is, the weight of the useful information (e.g. edge) contained in the removed components may be increased, while the weight of the useless information contained in the removed component may be decreased, and the weighted component is added to the de-noised low frequency component to acquire a compensated low frequency component, thus recovering as much as possible, or even enhancing, the useful information (e.g. edge) contained in the component removed during the de-noising process.

As shown in FIG. 3, the component that is removed as noise during the de-noising step (e.g. step 104 described above and step 404 to be described below) is estimated first in step 308-1. Specifically, the component that is removed during the de-noising process can be estimated according to the original low frequency component in each level obtained after the wavelet transform and the de-noised low frequency component. As a specific example, the difference between the original low frequency component and the de-noised low frequency component can be calculated as the removed component. For instance, providing that the original low frequency component is represented with $I_l$ and the de-noised low frequency component with $I_d$, the removed component $I_n$ can be estimated according to the following formula:

$$I_n(x_1, x_2, \ldots, x_n) = I_l(x_1, x_2, \ldots, x_n) - I_d(x_1, x_2, \ldots, x_n) \quad (2)$$

wherein $(x_1, x_2, \ldots, x_n)$ represents a pixel location in the input image, n represents the dimension number of the input image, $I_d(x_1, x_2, \ldots, x_n)$ represents a wavelet coefficient in the de-noised original low frequency component $I_d$ of the level corresponding to the pixel location, $I_l(x_1, x_2, \ldots, x_n)$ represents a wavelet coefficient in the original low frequency component $I_l$ of the level corresponding to the pixel location, and $I_n(x_1, x_2, \ldots, x_n)$ represents a wavelet coefficient in the estimated removed component $I_n$ corresponding to the pixel location.

As another example, the absolute value of the difference between the original low frequency component and the de-noised low frequency component may be calculated, as the component removed during the de-noising process as noise. It should be appreciated that the removed component may be estimated using any other appropriate method, which is not limited to the examples described above.

Then, the component removed as noise during the de-noising step 106 is weighted with the compensation template of the level in step 308-2. Specifically, with the edge information in the compensation template, the useful information (e.g. edge) contained in the removed component may be set with a weight higher than that for the useless information contained in the removed component, so as to enhance the useful information and constrain the useless information. Then, edge compensation is performed on the de-noised low frequency component with the weighted removed component in step 308-3.

As a specific example, the de-noised low frequency component may be compensated according to the following formula:

$$I'_l(x_1, x_2, \ldots, x_n) = I_d(x_1, x_2, \ldots, x_n) + I_n(x_1, x_2, \ldots, x_n) \cdot [T_{template}(x_1, x_2, \ldots, x_n)/T_{th}]^2 \quad (3)$$

wherein $(x_1, x_2, \ldots, x_n)$ represents epresents a location in the wavelet space, n represents the dimension number of the input image, $I_d(x_1, x_2, \ldots, x_n)$ represents a wavelet coefficient in the de-noised low frequency component $I_d$ of the level corresponding to the location in the wavelet space, $I_n(x_1, x_2, \ldots, x_n)$ represents a wavelet coefficient, that is contained in the estimated component $I_n$ that is removed as noise during the de-noising process, corresponding to the location in the wavelet space, $T_{template}(x_1, x_2, \ldots, x_n)$ represents a value in the compensation template $T_{template}$ corresponding to the location in the wavelet space, $T_{th}$ represents a predetermined threshold, and $I'_l(x_1, x_2, \ldots, x_n)$ represents a wavelet coefficient in the low frequency components $I_l$ corresponding to the location in the wavelet space.

In the example shown in formula (3), the value at a corresponding location of the noise component is weighted with the squared value of the ratio of the value in the compensation template to the threshold $T_{th}$. It can be seen that the part that is contained in the component removed as noise during the de-noising process and corresponds to the values in the compensation template greater than the threshold is considered as a part needing to be protected, and the part, in the same removed component, corresponding to the values in the compensation template smaller than the threshold is considered as a part needing to be constrained or removed. By using the above compensation method, the useful information (e.g. edge) that is removed during the de-noising process can be effectively compensated, thus the edges in the image are not blurred. In addition, due to the use of the threshold $T_{th}$, the weight values at different pixel locations change smoothly, thus achieving a continuity effect in local filtering.

Furthermore, by using of the squared value of the ratio, the part needing to be protected can be further increased in weight and the part needing to be constrained or removed is further decreased in weight, thereby enhancing the effects of the protection and constraint.

It should be appreciated that the threshold $T_{th}$ may be a value predetermined according to a practical application, e.g. an experimental value or empirical value resulting from an analysis on images of different types (or features). For example, a value between the edge (the useful information in the image) and noise can be selected as the threshold. For input images of different types, the threshold can be different.

For instance, in the case where the input image is a medical image that is formed by the data acquired by a medical diagnostic device, the threshold may be experimentally or empirically predetermined according to the type of each scanning protocol or imaging device. Optionally, the thresholds predetermined according to the types of a plurality of scanning protocols or imaging devices may be stored (for example, in the form of a configuration file) in a storage unit (built in the image processing apparatus or located outside the image processing apparatus in a manner accessible to the image processing apparatus) so that during the de-noising process, a corresponding threshold can be acquired (e.g. by reading from the storage unit) according to the type of the scanning protocol or imaging device of the input image, and as a further consequence, the degree of the automation of image processing is increased.

It can be noted that in formula (3), the useful information is enhanced when $(T_{template}(x_1, x_2, \ldots, x_n))$ is greater than 1. As an example, in the method shown in the formula (3), "1" is taken as the value of $(T_{template}(x_1, x_2, \ldots, x_n)/T_{th})$ in the case where $(T_{template}(x_1, x_2, \ldots, x_n)/T_{th})$ is greater than 1. In other words, when a value at a certain location of the compensation template is greater than or equal to the threshold $T_{th}$, a corresponding part in the noise component is added back to the low frequency component without being enhanced. By using this method, the useful information (e.g. edge) in the original image is kept without being enhanced, which protects the edge information of the image and keeps the processed image natural while avoiding a Gibbs phenomenon.

Figure 4:
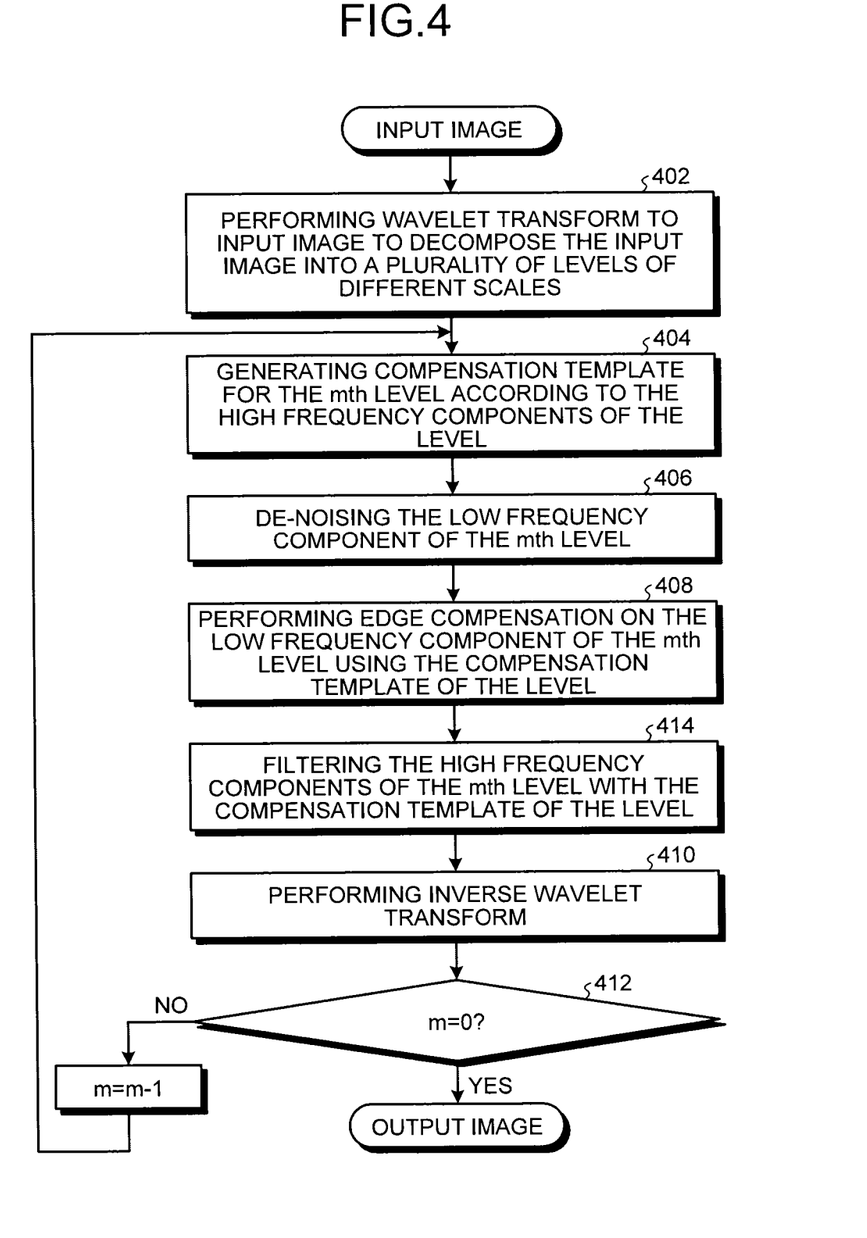
FIG. 4 is a flow chart illustrating an image processing method according to another embodiment of the present disclosure.

FIG. 4 is a flow chart illustrating an image processing method according to another embodiment of the present disclosure. The embodiment shown in FIG. 4 is similar to that shown in FIG. 1 except for the addition of a step of filtering the high frequency components of each level with the generated compensation template.

As shown in FIG. 4, the method may include steps 402, 404, 406, 408, 410 and step 412, and further includes step 414 before step 410.

Steps 402, 404, 406, 408, 410 and step 412 are respectively similar to the steps 102, 104, 106, 108, 110 and 112 that are described above with reference to FIG. 1-FIG. 3. It should be appreciated that the steps can be executed in an order different from that shown in FIG. 4. In other examples, for instance, steps 408 and 414 can be exchanged in execution order, and so do steps 404 and 406.

The high frequency components of each level are filtered with the compensation template of the level in step 414. The compensation template mentioned here refers to the one that is generated in step 404 with the plurality of high frequency components of the level. Specifically, by using the edge information in the compensation template, the part in each high frequency component corresponding to the edge information is enhanced, while the other part (noise) in the component is constrained, thereby enhancing the useful information and constraining the useless information.

As a specific example, each high frequency component in each level can be filtered according to the following formula:

$$I'_h(x_1, x_2, \ldots, x_n) = I_h(x_1, x_2, \ldots, x_n) \cdot [T_{template}(x_1, x_2, \ldots, x_n)/T_{th}]^2 \quad (4)$$

wherein $(x_1, x_2, \ldots, x_n)$ represents a location in the wavelet space, n represents the dimension number of the input image, $I_h(x_1, x_2, \ldots, x_n)$ represents a wavelet coefficient that is contained in a high frequency component $I_h$ in the level obtained from the wavelet transform on the input image and corresponds to the location in the wavelet space, $T_{template}(x_1, x_2, \ldots, x_n)$ represents a value in the compensation template of the level corresponding to the location in the wavelet space, $T_{th}$ represents a predetermined threshold, and $I'_h(x_1, x_2, \ldots, x_n)$ represents a wavelet coefficient in a filtered high frequency component $I'_h$ corresponding to the location in the wavelet space.

In the example shown in formula (4), the high frequency components are filtered with the squared value of the ratio of a value in the compensation template to the threshold $T_{th}$. It can be seen that the part in each high frequency component corresponding to the values in the compensation template greater than the threshold is considered as a part needing to be enhanced (that is, needing to be protected), and the part in the same component corresponding to the values in the compensation template smaller than the threshold is considered as a part needing to be constrained. Due to the use of the threshold $T_{th}$, the weight values at different locations change smoothly, thereby achieving the continuity effect in local filtering. In addition, by using the ratio, the protection effect and the constraint effect are enhanced.

As an example, in the method shown in formula (4) above for compensating a high frequency component, "1" is taken as the value of $(T_{template}(x_1, x_2, \ldots, x_n)/T_{th})$ in the case where $(T_{template}(x_1, x_2, \ldots, x_n)/T_{th})$ is greater than 1. By using this method, the influence caused by some strong noise points on the filtering algorithm may be prevented.

The predetermined threshold $T_{th}$ herein is similar to that described in the embodiment or example illustrated above with reference to FIG. 1-FIG. 3, the description of which is not repeated here.

Figure 5:
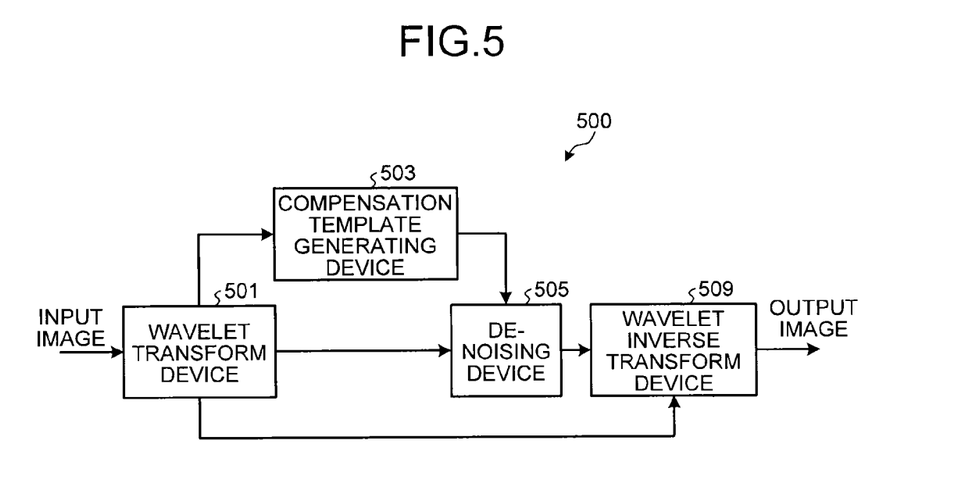
FIG. 5 is block diagram illustrating the structure of an image processing apparatus according to an embodiment of the present disclosure.

FIG. 5 is block diagram illustrating the structure of an image processing apparatus according to an embodiment of the present disclosure. Similar to the above-described method embodiments, the image processing apparatus 500 shown in FIG. 5 decomposes an input image into a plurality of levels of different scales through wavelet transform and then generates, with the high frequency components of each level, a compensation template capable of reflecting the combination characteristics of the high frequency components and performs an edge compensation on the de-noised low frequency component with the compensation template, thereby compensating edge blurring of the image resulted from a de-noising process.

As shown in FIG. 5, the image processing apparatus 500 may include a wavelet transform device 501, a compensation template generating device 503, a de-noising device 505 and a wavelet inverse transform device 509.

The wavelet transform device 501 may perform wavelet transform on an input image to decompose the input image into a plurality of levels of different scale. Each level includes a low frequency component and a plurality of high frequency component. For instance, it can be assumed that the input image is decomposed into (m+1) levels, that is, levels 0, 1, ..., m (m≥1). As shown in FIG. 1 or FIG. 4, the following processing is started from the level of the highest scale (e.g. the mth level). The wavelet transform device 501 can perform wavelet transform by using an algorithm similar to that used in step 102 or 402, the description of which is not repeated here.

The compensation template generating device 503 is used for generating a compensation template for a level according to the plurality of high frequency components of the level acquired by the wavelet transform device 501. The compensation template generating device 503 may generate a compensation template for a level by combining the high frequency components of the level, so that the generated compensation template can reflect the combination characteristics of the high frequency components of the level and thereby reflect the edge information of the input image reserved in the level.

The compensation template generating device 503 may generate the compensation template by using the method described in step 104 or 404. As a specific example, the compensation template generating device 503 may generate the compensation template by using the method of combining the high frequency components of each level described above with reference to FIG. 2. For instance, the compensation template generating device 503 may calculate the sum of the plurality of high frequency components in each level acquired by the wavelet transform device 501 and take the calculated sum as the compensation template for the level, or expand or diffuse the sum of the plurality of high frequency components in each level and take the expanded or diffused sum as the compensation template for the level, the description of which is not repeated here.

The de-noising device 505 is configured for de-noising the low frequency component in each level acquired by the wavelet transform device 501 by using any appropriate method (e.g. the method used in step 106 or 406, the description of which is not repeated here).

The de-noising device 505 is further configured to perform edge compensation on the de-noised low frequency component of each level by using the compensation template generated by the compensation template generating device 503 for the level. As mentioned above, the compensation template generated by the compensation template generating device 503 can reflect the edge information of the input image reserved in the level. Therefore, edge compensation may be performed on the de-noised low frequency component with the edge information in the compensation template. As a specific embodiment, the de-noising device 505 may compensate the low frequency component of each level using the method used in step 108 or 408 (e.g. the method described above with reference to FIG. 3), the description of which is not repeated here.

The wavelet inverse transformation device 509 is configured for performing an inverse wavelet transform according to the compensated low frequency component and high frequency components of each level output by the de-noising device 505. It should be appreciated that the wavelet inverse transformation device 509 can perform the inverse wavelet transform by using any appropriate algorithm, which is not defined and detailed herein.

Starting from the level of the highest scale (e.g. the mth level), the compensation template generating device 503, the de-noising device 505 and the wavelet inverse transformation device 509 repeat, by using the aforementioned method, the aforementioned processing on each following level until the level of the smallest scale (the 0th level), thereby acquiring a de-noised image.

In the image processing apparatus above, since edge compensation is performed on the de-noised image by using a compensation template reflecting the combination characteristics of the high frequency components of each level, edge blurring of the image may be avoided. In addition, in the conventional wavelet de-noising method generally a compromise algorithm is used to filter out noises while protecting the image from being severely blurred. However, in the image processing apparatus, since the edge compensation is performed by using the compensation template generating device and the de-noising device, the de-noising device may adopt any appropriate algorithm to remove as much noise as possible without worrying about the edge blurring in the image. Therefore, by using the image processing apparatus provided herein, a great amount of noise can be removed while the edge of the image is prevented from being blurred.

Figure 6:
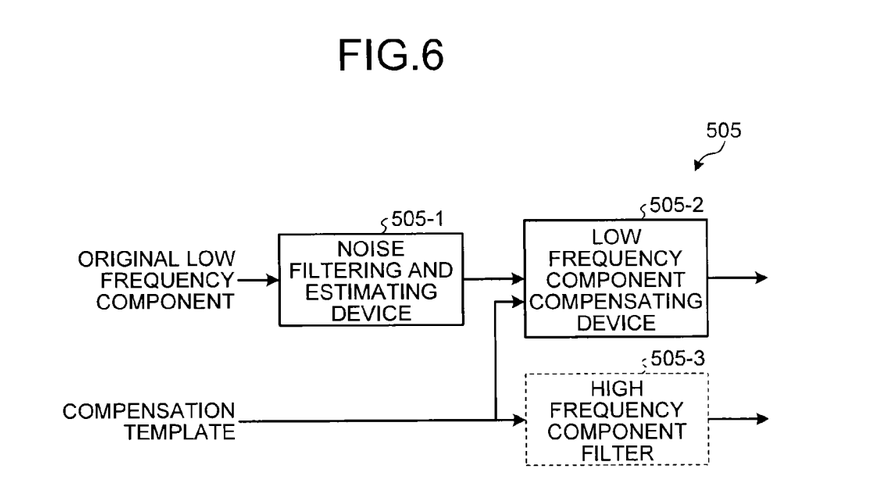
FIG. 6 is block diagram illustrating the structure of a de-noising device according to a specific embodiment of the present disclosure.

FIG. 6 is block diagram illustrating the structure of a de-noising structure according to a specific embodiment of the present disclosure. As mentioned above, the noise component removed during the de-noising process may contain some useful information (e.g. edge). The de-noising device shown in FIG. 6 may weight the removed noise component by using the edge information reflected in the compensation template, that is, increase the weight of the useful part (e.g. edge) contained in the removed noise component while decreasing that of the useless part contained in the same component, and add the weighted noise component and the de-noised low frequency component to take the resulting sum as the compensated low frequency component.

As shown in FIG. 6, the de-noising device 505 may include a noise filtering and estimating device 507-1 and a low frequency component compensating device 507-2.

The noise filtering and estimating device 507-1 may be used to de-noise the low frequency component in each level acquired by the wavelet transform device 501 by using any appropriate method (e.g. the method used in step 106 or 406, the description of which is not repeated here). The noise filtering and estimating device 507-1 is further configured to estimate the component removed as noise from the low frequency component of each level. Specifically, the noise filtering and estimating device 507-1 may estimate the removed component according to the original low frequency component in each level acquired by the wavelet transform device and the de-noised low frequency component of the level. As a specific example, the noise filtering and estimating device 507-1 may adopt the estimation method that is used in the embodiment or example described above with reference to FIG. 3, the description of which is not repeated here.

The low frequency component compensating device 507-2 may weight, with the compensation template generated by the compensation template generating device 503, the component removed as noise by the noise filtering and estimating device 507-1. Specifically, the low frequency component compensating device 507-2 sets, with the edge information in the compensation template, the weight for the useful information (e.g. edge) contained in the removed component to be higher than that for the useless information contained in the same component, thereby enhancing the useful information and constraining the useless information. Then, the low frequency component compensating device 507-2 performs edge compensation on the de-noised low frequency component with the weighted removed component and outputs the compensated low frequency component to the wavelet inverse transformation device 509.

As a specific example, the low frequency component compensating device 507-2 may perform the edge compensation on the de-noised low frequency component by using the compensation method (e.g. formula (3)) that is described above with reference to FIG. 3, the description of which is not repeated here.

As another specific embodiment, the de-noising device 505 may further include a high frequency component filter 507-3 (the dotted box shown in FIG. 6), which is configured for filtering the high frequency components of each level with the compensation template generated by the compensation template generating device 503 and outputting each compensated high frequency component to the wavelet inverse transformation device 509. Specifically, with the edge information in the compensation template, the wavelet inverse transformation device 509 can enhance the part in each high frequency component corresponding to edge information and constrain the other part in the high frequency component, thereby enhancing the useful information and constraining the useless information.

As a specific example, the high frequency component filter 507-3 may filter each high frequency component by using the compensation method (e.g. formula (4)) described above with reference to FIG. 4, the description of which is not repeated here.

The image processing apparatus and method provided in embodiments of the present disclosure can be applied to de-noise images of various types, including unidimensional or multi-dimensional (two-dimensional or three-dimensional) images. For instance, the image processing method or apparatus provided in the embodiments of the present disclosure may be applied to de-noise medical images (for example, an image formed by the data obtained by a medical diagnostic device). As an example, each step of the above-describe method and each module and/or unit of the above-described apparatus may be implemented by software, firmware, hardware of a medical diagnostic device (e.g. X-ray diagnostic device, UL diagnostic device, CT device, MRI diagnostic device and PET device) or a combination thereof and serve as part of the medical diagnostic device. As an example, the above-described method and/or apparatus may be implemented in an existing medical diagnostic device by making some modification on the components of the existing medical diagnostic device. As another example, each step of the above-described method and each module and/or unit of the above-described apparatus may be implemented as an apparatus independent from the above-described medical diagnostic device. Each module and unit in the foregoing apparatus can be configured through software, firmware, hardware or any combination thereof in a way or by a means that is well known to those skilled in the art and is therefore not repeatedly described.

As an example, each step of the above-described method and each module and/or unit of the above-described apparatus may be implemented as software, firmware, hardware or any combination thereof. In the case where each step of the above-described method and each module and/or unit of the above-described apparatus are achieved through software or firmware, a software program for realizing the above-described method is installed in a computer with a specific hardware structure (e.g. the general computer 800 shown in FIG. 8) from a storage medium or network, and the computer, when installed with a program, is capable of the functions of the program.

Figure 8:
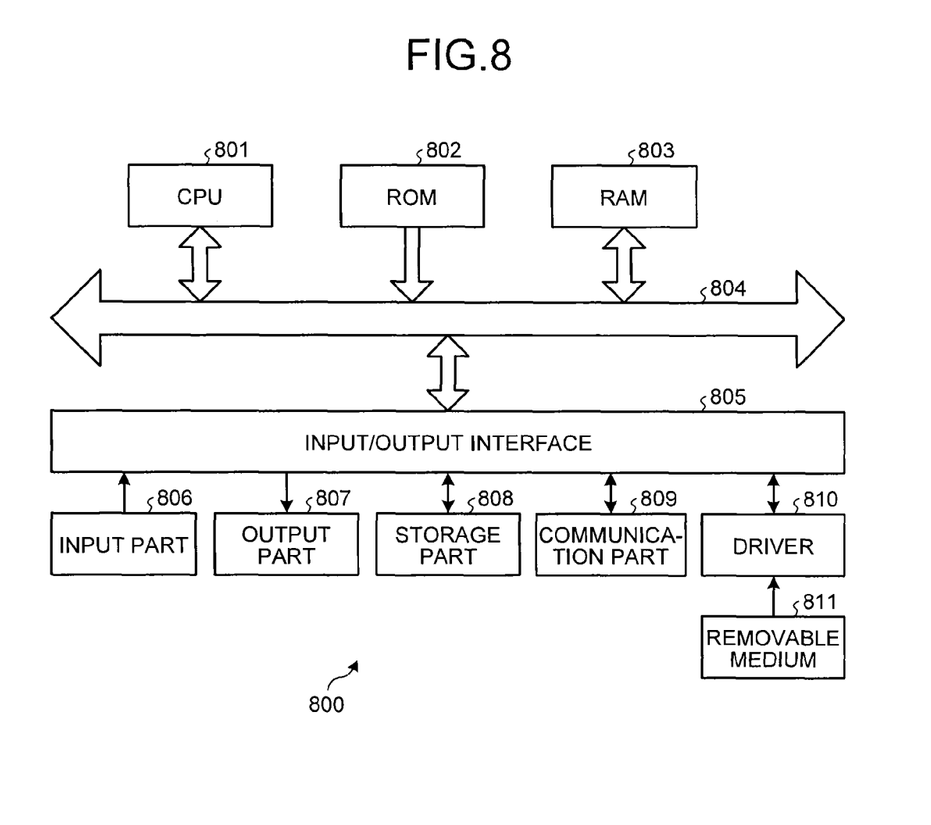
FIG. 8 is an exemplary block diagram illustrating the structure of a computer capable of realizing the embodiments/examples of the present disclosure.

In FIG. 8, a central processing unit (CPU) 801 executes various processing according to the program stored in a read-only memory (ROM) 802 or a program loaded to a random access memory (RAM) 808 from a memory part 803. The data needed for the various processing of CPU 803 may be stored in RAM 801 as needed. CPU 801, ROM 802 and RAM 803 are connected with each other via a bus 804, with which an input/output 805 is also connected.

The following components are linked with the input/output 805: an input part 806 (including keyboard, mouse and the like), an output part 807 (including displays such as cathode ray tube (CRT), liquid crystal display (LCD) and loudspeaker), the memory part 808 (including hard disk) and a communication part 809 (including a network interface card such as LAN card and modem). The communication part 809 realizes a communication via a network such as the Internet. A driver 810 may also be connected with the input/output interface 805, if needed. If needed, a removable medium 811, for example, a magnetic disc, an optical disc, a magnetic optical disc, a semiconductor memory and the like, may be installed on the driver 810 to read a computer program therefrom and install the read computer program in the memory part 808.

In the case where the foregoing series of processing is achieved through a piece of software, programs constituting the piece of software are installed from a network such as the Internet or a storage medium such as the removable medium 811.

It should be appreciated by those skilled in this art that the storage medium is not limited to the removable mediums 811 shown in FIG. 8 in which programs are stored and which are distributed separated from the apparatus to provide the programs for users. Examples of the removable medium 811 include magnetic disc (including soft disc (trademark)), optical disc (including compact disc read-only memory (CD-ROM) and digital video disk (DVD)), magnetic optical disc (including mini disc (MD)(trademark)), and semiconductor memory. Or the storage mediums may be the hard discs included in the ROM 802 and the memory part 808, in which programs are stored that are distributed to users along with the devices containing them.

The present disclosure further provides a program product stored with computer-readable instruction codes, which, when read and executed by a computer, are capable of realizing the above-described method provided in the embodiments of the present disclosure.

Accordingly, a storage medium for storing the program product stored with computer-readable instruction codes is also included in the disclosure of the present disclosure. The storage medium includes but is not limited to soft disc, optical disc, magnetic optical disc, memory card, memory stick and the like.

In the foregoing description on the specific embodiments of the present disclosure, the features described and/or shown for an implementation mode may be used in one or more other implementation modes in the same or like way or combined with the features of the other implementation modes, or replace the features of the other implementation modes.

It should be emphasized that the terms 'comprise/include', as used herein, means the existence of a feature, element, step or component in a way not exclusive of the existence or addition of one or more other features, elements, steps or components.

In the above-described embodiments and examples, each step and/or unit is represented with a reference sign consisting of figures. It should be understood by those of ordinary skill of the art that the reference signs are merely intended to facilitate description and drawing but are not to be construed as a limitation on an order or any other aspect.

Furthermore, the method provided in the present disclosure is not limited to be performed in accordance with the time sequence described herein and can be performed sequentially, synchronously or independently in accordance with another time sequence. Therefore, the implementation order of the method described in this specification is not to be construed as limiting the scope of the present disclosure.

Although the present disclosure has been disclosed with reference to specific embodiments herein, it should be understood that all the implementation modes and examples described above are merely illustrative of the present disclosure but should not be construed as limiting the present disclosure. Various modifications, improvements or equivalents can be devised by those skilled in the art without departing from the spirit and scope of the invention, and such modifications, improvements or equivalents should be considered to be within the scope of the present disclosure.

What is claimed is:

1. An image processing apparatus, comprising:
    a wavelet transform device for performing wavelet transform on an input image to decompose the input image into a plurality of levels of different scales, each level including a low frequency component and a plurality of high frequency components;
    a compensation template generating device for generating a compensation template for each level according to the plurality of high frequency components in the level obtained from the wavelet transform, the compensation template reflecting combination features of the plurality of high frequency components of the level;
    a de-noising device for de-noising the low frequency component of each level and performing edge compensation after de-noising the low frequency component of the level by using the compensation template of the level to acquire a compensated low frequency component; and
    a wavelet inverse transform device for performing inverse wavelet transform with the compensated low frequency component and the high frequency components of each level, to acquire a de-noised image,
    wherein the compensation template generating device is configured to calculate sum of the plurality of high frequency components in each level acquired by the wavelet transform device, and expand or diffuse the sum of the high frequency components of each level, as the compensation template,
    wherein the de-noising device comprises a low frequency component compensating device for weighting a removed component that is removed as noise by the de-noising device with the compensation template of the level and compensating the de-noised low frequency component with the weighted removed component, and
    wherein, when a value at a certain location of the compensation template is greater than a threshold, the low frequency component compensating device does not enhance the removed component.

2. The image processing apparatus according to claim 1, wherein the de-noising device further comprises:
    a noise filtering and estimating device for de-noising the low frequency component of each level and estimating the removed component according to the low frequency component and the de-noised low frequency component of each level,
    wherein the low frequency component compensating device weights the estimated removed component with the compensation template of the level and compensating the de-noised low frequency component with the weighted removed component.

3. The image processing apparatus according to claim 2, wherein the low frequency component compensating device is configured to compensate, with the compensation template of each level, the de-noised low frequency component of the level according to the following formula:

$$I'_l(x_1,x_2,\ldots,x_n) = I_d(x_1,x_2,\ldots,x_n) + I_n(x_1,x_2,\ldots,x_n) \cdot [T_{template}(x_1,x_2,\ldots,x_n)/T_{th}]^2$$

wherein $(x_1, x_2, \ldots, x_n)$ represents a location in a wavelet space the input image, n represents dimension number of the input image, $I_d(x_1, x_2, \ldots, x_n)$ represents a wavelet coefficient in the de-noised low frequency component of each level corresponding to the location in the wavelet space, $I_n(x_1, x_2, \ldots, x_n)$ represents a wavelet coefficient in the removed component filtered as noise by the noise filtering and estimating device corresponding to the location in the wavelet space, $T_{template}(x_1, x_2, \ldots, x_n)$ represents a value in the compensation template of the level corresponding to the location in the wavelet space, $T_{th}$ represents the threshold, and $I'_l(x_1, x_2, \ldots, x_n)$ represents a wavelet coefficient in compensated low frequency component corresponding to the location in the wavelet space.

4. The image processing apparatus according to claim 3, wherein the low frequency component compensating device sets $(T_{template}(x_1, x_2, \ldots, x_n)/T_{th})$ to be 1 if $(T_{template}(x_1, x_2, \ldots, x_n)/T_{th})$ is greater than 1.

5. The image processing apparatus according to claim 1, wherein the de-noising device further comprises a high frequency component filter for filtering the plurality of high frequency components of each level with the compensation template of the level.

6. The image processing apparatus according to claim 5, wherein the high frequency component filter is configured to filter, with the compensation template of each level, the high frequency components of the level according to the following formula:

$$I'_h(x_1, x_2, \ldots, x_n) = I_h(x_1, x_2, \ldots, x_n) \cdot [T_{template}(x_1, x_2, \ldots, x_n)/T_{th}]^2$$

wherein $(x_1, x_2, \ldots, x_n)$ represents a location in a wavelet space, n represents dimension number of the input image, $I_h(x_1, x_2, \ldots, x_n)$ represents a wavelet coefficient in the high frequency components of each level corresponding to the location in the wavelet space, $T_{template}(x_1, x_2, \ldots, x_n)$ represents a value in the compensation template of the level corresponding to the location in the wavelet space, $T_{th}$ represents the threshold, and $I'_h(x_1, x_2, \ldots, x_n)$ represents a wavelet coefficient in filtered high frequency component corresponding to the location in the wavelet space.

7. The image processing apparatus according to claim 6, wherein the high frequency component filter sets $T_{template}(x_1, x_2, \ldots, x_n)/T_{th})$ to be 1 is $T_{template}(x_1, x_2, \ldots, x_n)/T_{th})$ is greater than 1.

8. The image processing apparatus according to claim 1, wherein the input image is a medical image formed by the data acquired by a medical diagnostic device.

9. An image processing method, comprising the following steps of:
performing wavelet transform on an input image to decompose the input image into a plurality of levels of different scales, each level comprising a low frequency component and a plurality of high frequency components;
generating a compensation template for each level according to the plurality of high frequency components in the level obtained from the wavelet transform, the compensation template reflecting combination feature of the plurality of high frequency components of the level;
de-noising the low frequency component in each level and performing edge compensation after de-noising the low frequency component of the level with the compensation template of the level; and
performing inverse wavelet transform with the compensated low frequency component and the high frequency components of each level to acquire a de-noised image,
wherein generating the compensation template comprises calculating sum of the plurality of high frequency components in each level resulting from the wavelet transform, and expanding or diffusing the sum of the high frequency components of each level, as the compensation template,
wherein weighting a removed component that is removed during the de-noising process as noise with the compensation template of the level and compensating the de-noised low frequency component with the weighted removed component, and
wherein, when a value at a certain location of the compensation template is greater than a threshold, the removed component is not enhanced.

10. The image processing method according to claim 9, wherein performing the edge compensation on the de-noised low frequency component of each level with the compensation template of the level comprises:
estimating the removed component according to the low frequency component in each level obtained from the wavelet transform and the de-noised low frequency component; and
weighting the estimated removed component with the compensation template of the level and compensating the de-noised low frequency component with the weighted removed component.

11. The image processing method according to claim 10, wherein weighting the removed component and compensating the de-noised low frequency component with the weighted removed component comprises:
compensating, with the compensation template of the level, the de-noised low frequency component according to the following formula:

$$I'_l(x_1, x_2, \ldots, x_n) = I_d(x_1, x_2, \ldots, x_n) + I_n(x_1, x_2, \ldots, x_n) \cdot [T_{template}(x_1, x_2, \ldots, x_n)/T_{th}]^2$$

wherein $(x_1, x_2, \ldots, x_n)$ represents a location in a wavelet space, n represents dimension number of the input image, $I_d(x_1, x_2, \ldots, x_n)$ represents a wavelet coefficient in the de-noised low frequency component of the level corresponding to the location in the wavelet space, $I_n(x_1, x_2, \ldots, x_n)$ represents a wavelet coefficient in the estimated removed component corresponding to the location in the wavelet space, $T_{template}(x_1, x_2, \ldots, x_n)$ represents a value in the compensation template corresponding to the location in the wavelet space, $T_{th}$ represents the threshold, and $I'_l(x_1, x_2, \ldots, x_n)$ represents a wavelet coefficient in the compensated low frequency component corresponding to the location in the wavelet space.

12. The image processing method according to claim 11, wherein the value of $T_{template}(x_1, x_2, \ldots, x_n)/T_{th})$ is set to 1 in the case where $T_{template}(x_1, x_2, \ldots, x_n)/T_{th})$ is greater than 1.

13. The image processing method according to claim 9, further comprising, before performing an inverse wavelet transform, a step of:
filtering the plurality of high frequency components of each level with the compensation template of the level.

14. The image processing method according to claim 13, wherein filtering the plurality of high frequency components of each level with the compensation template of the level comprises:
filtering, with the compensation template of the level, the plurality of high frequency components of the level according to the following formula:

$$I'_h(x_1, x_2, \ldots, x_n) = I_h(x_1, x_2, \ldots, x_n) \cdot [T_{template}(x_1, x_2, \ldots, x_n)/T_{th}]^2$$

wherein $(x_1, x_2, \ldots, x_n)$ represents a location in a wavelet space, n represents dimension number of the input image, $I_h(x_1, x_2, \ldots, x_n)$ represents a wavelet coefficient in the high frequency components in the level obtained from the wavelet transform corresponding to the location in the wavelet space, $T_{template}(x_1, x_2, \ldots, x_n)$ represents a value in the compensation template corresponding to the location in the wavelet space, $T_{th}$ represents the threshold, and $I'_h(x_1, x_2, \ldots, x_n)$ represents a wavelet coefficient in filtered high frequency components corresponding to the location in the wavelet space.

15. The image processing method according to claim 14, wherein the value of $T_{template}(x_1, x_2, \ldots, x_n)/T_{th}$ is set to 1 in the case where $T_{template}(x_1, x_2, \ldots, x_n)/T_{th}$ is greater than 1.

16. The image processing method according to claim 9, wherein the input image is a medical image formed by the data acquired by a medical diagnostic device.

* * * * *